(12) United States Patent
Taylor et al.

(10) Patent No.: US 8,464,939 B1
(45) Date of Patent: *Jun. 18, 2013

(54) CARD REGISTRY SYSTEMS AND METHODS

(75) Inventors: Ty Taylor, Rancho Santa Margarita, CA (US); Michael R. Balducci, Aliso Viejo, CA (US); Arlene E. Miranda, Huntington Beach, CA (US); Laura Gelgand, Corona del Mar, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 13/411,914

(22) Filed: Mar. 5, 2012

Related U.S. Application Data

(63) Continuation of application No. 12/334,278, filed on Dec. 12, 2008, now Pat. No. 8,127,986.

(60) Provisional application No. 61/013,877, filed on Dec. 14, 2007.

(51) Int. Cl.
*G06K 5/00* (2006.01)

(52) U.S. Cl.
USPC .......................................................... 235/380

(58) Field of Classification Search
USPC .......................................................... 235/380
See application file for complete search history.

(56) References Cited

U.S. PATENT DOCUMENTS

| | | | |
|---|---|---|---|
| 4,346,442 A | 8/1982 | Musmanno |
| 5,148,365 A | 9/1992 | Dembo |
| 5,500,513 A | 3/1996 | Langhans et al. |
| 5,590,038 A | 12/1996 | Pitroda |
| 5,640,577 A | 6/1997 | Scharmer |
| 5,649,114 A | 7/1997 | Deaton et al. |
| 5,659,731 A | 8/1997 | Gustafson |
| 5,692,107 A | 11/1997 | Simoudis et al. |
| 5,754,939 A | 5/1998 | Herz et al. |
| 5,819,234 A | 10/1998 | Slavin et al. |
| 5,822,751 A | 10/1998 | Gray et al. |
| 5,828,837 A | 10/1998 | Eikland |
| 5,844,218 A | 12/1998 | Kawan et al. |
| 5,881,131 A | 3/1999 | Farris et al. |
| 5,903,830 A | 5/1999 | Joao et al. |

(Continued)

FOREIGN PATENT DOCUMENTS

| | | |
|---|---|---|
| WO | WO 01/84281 | 11/2001 |
| WO | WO 2004/114160 | 12/2004 |

OTHER PUBLICATIONS

U.S. Appl. No. 12/705,489, filed Feb. 12, 2010, Bargoli et al.
U.S. Appl. No. 12/705,511, filed Feb. 12, 2010, Bargoli et al.

(Continued)

*Primary Examiner* — Daniel Hess
*Assistant Examiner* — David Tardif
(74) *Attorney, Agent, or Firm* — Knobbe, Martens, Olson & Bear, LLP

(57) ABSTRACT

A card registry system is configured to automatically identify financial card information in one or more credit files associated with a consumer and populate a card registry account of the consumer with the identified financial card information. Once the financial card information has been obtained from the credit file(s), the card registry system may transmit cancellation and/or reissuance requests to the respective card issuers in the instance that one or more cards are compromised, so that the financial cards may be easily and efficiently cancelled and/or reissued at the request of the consumer.

18 Claims, 10 Drawing Sheets

U.S. PATENT DOCUMENTS

| | | | |
|---|---|---|---|
| 5,903,881 | A | 5/1999 | Schrader et al. |
| 5,940,812 | A | 8/1999 | Tengel et al. |
| 5,956,693 | A | 9/1999 | Geerlings |
| 5,961,593 | A | 10/1999 | Gabber et al. |
| 5,970,478 | A | 10/1999 | Walker et al. |
| 5,978,780 | A | 11/1999 | Watson |
| 5,990,038 | A | 11/1999 | Suga et al. |
| 5,999,596 | A | 12/1999 | Walker et al. |
| 6,021,943 | A | 2/2000 | Chastain |
| 6,038,551 | A | 3/2000 | Barlow et al. |
| 6,070,147 | A | 5/2000 | Harms et al. |
| 6,073,140 | A | 6/2000 | Morgan et al. |
| 6,128,602 | A | 10/2000 | Northington et al. |
| 6,144,948 | A | 11/2000 | Walker et al. |
| 6,157,927 | A | 12/2000 | Schaefer et al. |
| 6,233,566 | B1 | 5/2001 | Levine et al. |
| 6,254,000 | B1 | 7/2001 | Degen et al. |
| 6,311,169 | B2 | 10/2001 | Duhon |
| 6,343,279 | B1 | 1/2002 | Bissonette et al. |
| 6,374,230 | B1 | 4/2002 | Walker et al. |
| 6,393,406 | B1 | 5/2002 | Eder |
| 6,405,173 | B1 | 6/2002 | Honarvar |
| 6,446,200 | B1 | 9/2002 | Ball et al. |
| 6,457,012 | B1 | 9/2002 | Jatkowski |
| 6,463,533 | B1 | 10/2002 | Calamera et al. |
| 6,523,022 | B1 | 2/2003 | Hobbs |
| 6,523,041 | B1 | 2/2003 | Morgan et al. |
| 6,601,173 | B1 | 7/2003 | Mohler |
| 6,748,426 | B1 | 6/2004 | Shaffer et al. |
| 6,766,327 | B2 | 7/2004 | Morgan, Jr. et al. |
| 6,804,346 | B1 | 10/2004 | Mewhinney |
| 6,901,406 | B2 | 5/2005 | Nabe et al. |
| 6,910,624 | B1 | 6/2005 | Natsuno |
| 6,934,714 | B2 | 8/2005 | Meinig |
| 6,957,336 | B2 | 10/2005 | Wheeler et al. |
| 6,962,336 | B2 | 11/2005 | Glass |
| 6,968,319 | B1 | 11/2005 | Remington et al. |
| 6,983,379 | B1 | 1/2006 | Spalink et al. |
| 6,983,478 | B1 | 1/2006 | Grauch et al. |
| 6,985,887 | B1 | 1/2006 | Sunstein et al. |
| 7,028,052 | B2 | 4/2006 | Chapman et al. |
| 7,035,855 | B1 | 4/2006 | Kilger et al. |
| 7,072,909 | B2 | 7/2006 | Polk |
| 7,076,475 | B2 | 7/2006 | Honarvar |
| 7,107,285 | B2 | 9/2006 | Von Kaenel et al. |
| 7,181,418 | B1 | 2/2007 | Zucker et al. |
| 7,185,016 | B1 | 2/2007 | Rasmussen |
| 7,200,602 | B2 | 4/2007 | Jonas |
| 7,249,076 | B1 | 7/2007 | Pendleton et al. |
| 7,249,113 | B1 | 7/2007 | Continelli et al. |
| 7,272,591 | B1 | 9/2007 | Ghazal et al. |
| 7,281,652 | B2 | 10/2007 | Foss |
| 7,314,167 | B1 | 1/2008 | Kiliccote |
| 7,315,837 | B2 | 1/2008 | Sloan et al. |
| 7,330,835 | B2 | 2/2008 | Deggendorf |
| 7,343,149 | B2 | 3/2008 | Benco |
| 7,343,295 | B2 | 3/2008 | Pomerance |
| 7,370,044 | B2 | 5/2008 | Mulhern et al. |
| 7,386,511 | B2 | 6/2008 | Buchanan et al. |
| 7,389,913 | B2 | 6/2008 | Starrs |
| 7,403,942 | B1 | 7/2008 | Bayliss |
| 7,409,369 | B1 | 8/2008 | Homuth et al. |
| 7,433,864 | B2 | 10/2008 | Malik |
| 7,451,113 | B1 | 11/2008 | Kasower |
| 7,458,508 | B1 | 12/2008 | Shao et al. |
| 7,475,032 | B1 | 1/2009 | Patnode et al. |
| 7,505,931 | B2 | 3/2009 | Da Silva |
| 7,509,117 | B2 | 3/2009 | Yum |
| 7,512,221 | B2 | 3/2009 | Toms |
| 7,529,698 | B2 | 5/2009 | Joao |
| 7,536,346 | B2 | 5/2009 | Aliffi et al. |
| 7,542,993 | B2 | 6/2009 | Satterfield et al. |
| 7,543,739 | B2 | 6/2009 | Brown et al. |
| 7,548,886 | B2 | 6/2009 | Kirkland et al. |
| 7,562,184 | B2 | 7/2009 | Henmi et al. |
| 7,575,157 | B2 | 8/2009 | Barnhardt et al. |
| 7,580,884 | B2 | 8/2009 | Cook |
| 7,581,112 | B2 | 8/2009 | Brown et al. |
| 7,584,146 | B1 | 9/2009 | Duhon |
| 7,610,216 | B1 | 10/2009 | May et al. |
| 7,620,596 | B2 | 11/2009 | Knudson et al. |
| 7,647,274 | B2 | 1/2010 | Peterson et al. |
| 7,653,600 | B2 | 1/2010 | Gustin |
| 7,672,833 | B2 | 3/2010 | Blume et al. |
| 7,672,924 | B1 | 3/2010 | Scheurich et al. |
| 7,672,926 | B2 | 3/2010 | Ghazal et al. |
| 7,686,214 | B1 | 3/2010 | Shao et al. |
| 7,689,487 | B1 | 3/2010 | Britto et al. |
| 7,689,505 | B2 | 3/2010 | Kasower |
| 7,690,032 | B1 | 3/2010 | Peirce |
| 7,708,190 | B2 | 5/2010 | Brandt et al. |
| 7,711,635 | B2 | 5/2010 | Steele et al. |
| 7,720,705 | B2 | 5/2010 | Stein |
| 7,725,385 | B2 | 5/2010 | Royer et al. |
| 7,752,236 | B2 | 7/2010 | Williams et al. |
| 7,761,384 | B2 | 7/2010 | Madhogarhia |
| 7,765,148 | B2 | 7/2010 | German et al. |
| 7,769,697 | B2 | 8/2010 | Fieschi et al. |
| 7,774,270 | B1 | 8/2010 | MacCloskey |
| 7,801,828 | B2 | 9/2010 | Candella et al. |
| 7,802,104 | B2 | 9/2010 | Dickinson |
| 7,827,115 | B2 | 11/2010 | Weller et al. |
| 7,835,990 | B2 | 11/2010 | Coleman |
| 7,853,493 | B2 | 12/2010 | DeBie et al. |
| 7,966,192 | B2 | 6/2011 | Pagliari et al. |
| 7,991,689 | B1 | 8/2011 | Brunzell et al. |
| 8,127,986 | B1 * | 3/2012 | Taylor et al. .................. 235/380 |
| 8,195,549 | B2 | 6/2012 | Kasower |
| 2001/0029482 | A1 | 10/2001 | Tealdi et al. |
| 2001/0044729 | A1 | 11/2001 | Pomerance |
| 2001/0049620 | A1 | 12/2001 | Blasko |
| 2002/0010616 | A1 | 1/2002 | Itzaki |
| 2002/0013899 | A1 | 1/2002 | Faul |
| 2002/0026507 | A1 | 2/2002 | Sears et al. |
| 2002/0059139 | A1 | 5/2002 | Evans |
| 2002/0069122 | A1 | 6/2002 | Yun et al. |
| 2002/0077964 | A1 | 6/2002 | Brody et al. |
| 2002/0087460 | A1 | 7/2002 | Hornung |
| 2002/0099635 | A1 | 7/2002 | Guiragosian |
| 2002/0103809 | A1 | 8/2002 | Starzl et al. |
| 2002/0111890 | A1 | 8/2002 | Sloan et al. |
| 2002/0128962 | A1 | 9/2002 | Kasower |
| 2002/0133462 | A1 | 9/2002 | Shteyn |
| 2002/0133504 | A1 | 9/2002 | Vlahos et al. |
| 2002/0169747 | A1 | 11/2002 | Chapman et al. |
| 2002/0173994 | A1 | 11/2002 | Ferguson, III |
| 2002/0194120 | A1 | 12/2002 | Russell et al. |
| 2003/0009418 | A1 | 1/2003 | Green et al. |
| 2003/0018578 | A1 | 1/2003 | Schultz |
| 2003/0028466 | A1 | 2/2003 | Jenson et al. |
| 2003/0028477 | A1 | 2/2003 | Stevenson et al. |
| 2003/0097342 | A1 | 5/2003 | Whittingtom |
| 2003/0163435 | A1 | 8/2003 | Payone |
| 2003/0208412 | A1 | 11/2003 | Hillestad et al. |
| 2004/0006536 | A1 | 1/2004 | Kawashima et al. |
| 2004/0044563 | A1 | 3/2004 | Stein |
| 2004/0078323 | A1 | 4/2004 | Johnston et al. |
| 2004/0111359 | A1 | 6/2004 | Hudock |
| 2004/0139025 | A1 | 7/2004 | Coleman |
| 2004/0177035 | A1 | 9/2004 | Silva |
| 2004/0199456 | A1 | 10/2004 | Flint et al. |
| 2004/0230534 | A1 | 11/2004 | McGough |
| 2004/0236688 | A1 | 11/2004 | Bozeman |
| 2004/0243508 | A1 | 12/2004 | Samson et al. |
| 2005/0021476 | A1 | 1/2005 | Candella et al. |
| 2005/0027632 | A1 | 2/2005 | Zeitoun et al. |
| 2005/0137899 | A1 | 6/2005 | Davies et al. |
| 2006/0031158 | A1 | 2/2006 | Orman |
| 2006/0032909 | A1 | 2/2006 | Seegar |
| 2006/0059110 | A1 | 3/2006 | Madhok et al. |
| 2006/0080263 | A1 | 4/2006 | Willis et al. |
| 2006/0106670 | A1 | 5/2006 | Cai et al. |
| 2006/0131390 | A1 | 6/2006 | Kim |
| 2006/0173776 | A1 | 8/2006 | Shalley et al. |
| 2006/0178971 | A1 | 8/2006 | Owen et al. |
| 2006/0223043 | A1 | 10/2006 | Dancy-Edwards et al. |
| 2006/0239512 | A1 | 10/2006 | Petrillo |

| | | | |
|---|---|---|---|
| 2006/0271456 A1 | 11/2006 | Romain et al. | |
| 2006/0271457 A1 | 11/2006 | Romain et al. | |
| 2006/0282359 A1 | 12/2006 | Nobili et al. | |
| 2007/0038483 A1 | 2/2007 | Wood | |
| 2007/0072190 A1 | 3/2007 | Aggarwal | |
| 2007/0078985 A1 | 4/2007 | Shao et al. | |
| 2007/0083460 A1 | 4/2007 | Bachenheimer | |
| 2007/0093234 A1 | 4/2007 | Willis et al. | |
| 2007/0094137 A1 | 4/2007 | Phillips et al. | |
| 2007/0112668 A1 | 5/2007 | Celano et al. | |
| 2007/0124256 A1 | 5/2007 | Crooks et al. | |
| 2007/0156554 A1 | 7/2007 | Nikoley et al. | |
| 2007/0174448 A1 | 7/2007 | Ahuja et al. | |
| 2007/0205266 A1 | 9/2007 | Carr et al. | |
| 2007/0220003 A1 | 9/2007 | Chern et al. | |
| 2007/0226047 A1 | 9/2007 | Ward | |
| 2007/0244807 A1 | 10/2007 | Andringa et al. | |
| 2007/0262140 A1 | 11/2007 | Long, Sr. | |
| 2007/0288355 A1 | 12/2007 | Roland et al. | |
| 2007/0299770 A1 | 12/2007 | Delinsky | |
| 2008/0010206 A1 | 1/2008 | Coleman | |
| 2008/0021802 A1 | 1/2008 | Pendleton | |
| 2008/0052244 A1 | 2/2008 | Tsuei et al. | |
| 2008/0059352 A1 | 3/2008 | Chandran | |
| 2008/0066188 A1 | 3/2008 | Kwak | |
| 2008/0077526 A1 | 3/2008 | Arumugam | |
| 2008/0086400 A1 | 4/2008 | Ardelean et al. | |
| 2008/0091519 A1 | 4/2008 | Foss | |
| 2008/0103800 A1 | 5/2008 | Domenikos et al. | |
| 2008/0103972 A1 | 5/2008 | Lanc | |
| 2008/0126233 A1 | 5/2008 | Hogan | |
| 2008/0162383 A1 | 7/2008 | Kraft | |
| 2008/0175360 A1 | 7/2008 | Schwarz et al. | |
| 2008/0183480 A1 | 7/2008 | Carlson et al. | |
| 2008/0221972 A1 | 9/2008 | Megdal et al. | |
| 2008/0222027 A1 | 9/2008 | Megdal et al. | |
| 2008/0270209 A1 | 10/2008 | Mauseth et al. | |
| 2008/0270295 A1 | 10/2008 | Lent et al. | |
| 2008/0288299 A1 | 11/2008 | Baldwin, Jr. et al. | |
| 2008/0294501 A1 | 11/2008 | Rennich et al. | |
| 2008/0319889 A1* | 12/2008 | Hammad | 705/35 |
| 2009/0006230 A1 | 1/2009 | Lyda et al. | |
| 2009/0024484 A1 | 1/2009 | Walker et al. | |
| 2009/0037332 A1 | 2/2009 | Cheung et al. | |
| 2009/0048957 A1 | 2/2009 | Celano | |
| 2009/0106141 A1 | 4/2009 | Becker | |
| 2009/0106846 A1 | 4/2009 | Dupray et al. | |
| 2009/0125369 A1 | 5/2009 | Kloostra et al. | |
| 2009/0126013 A1 | 5/2009 | Atwood et al. | |
| 2009/0164380 A1 | 6/2009 | Brown | |
| 2009/0177529 A1 | 7/2009 | Hadi | |
| 2009/0248573 A1 | 10/2009 | Haggerty et al. | |
| 2009/0254476 A1 | 10/2009 | Sharma et al. | |
| 2009/0260064 A1 | 10/2009 | Mcdowell et al. | |
| 2009/0280467 A1 | 11/2009 | Ahart | |
| 2009/0307778 A1 | 12/2009 | Mardikar | |
| 2010/0009320 A1 | 1/2010 | Wilkelis | |
| 2010/0011428 A1* | 1/2010 | Atwood et al. | 726/7 |
| 2010/0023434 A1 | 1/2010 | Bond | |
| 2010/0023448 A1 | 1/2010 | Eze | |
| 2010/0030677 A1 | 2/2010 | Melik-Aslanian et al. | |
| 2010/0036697 A1 | 2/2010 | Kelnar | |
| 2010/0043055 A1 | 2/2010 | Baumgart | |
| 2010/0094768 A1 | 4/2010 | Miltonberger | |
| 2010/0100945 A1 | 4/2010 | Ozzie et al. | |
| 2010/0114747 A1* | 5/2010 | Kasower | 705/35 |
| 2010/0114776 A1 | 5/2010 | Weller et al. | |
| 2010/0130172 A1 | 5/2010 | Vendrow et al. | |
| 2010/0145840 A1* | 6/2010 | Kasower | 705/35 |
| 2010/0179906 A1 | 7/2010 | Hawkes | |
| 2010/0205662 A1 | 8/2010 | Ibrahim et al. | |
| 2010/0229245 A1 | 9/2010 | Singhal | |
| 2010/0241535 A1 | 9/2010 | Nightengale et al. | |
| 2010/0280914 A1 | 11/2010 | Carlson | |
| 2011/0004498 A1 | 1/2011 | Readshaw | |
| 2011/0035788 A1 | 2/2011 | White et al. | |
| 2011/0087575 A1 | 4/2011 | Debie et al. | |
| 2012/0022990 A1 | 1/2012 | Kasower | |
| 2012/0095894 A1 | 4/2012 | Campbell et al. | |
| 2012/0136763 A1 | 5/2012 | Megdal et al. | |
| 2012/0158574 A1 | 6/2012 | Brunzell et al. | |

OTHER PUBLICATIONS

"Judging Credit: Consumers Need Better Finance Tools", News Journal, Daytona Beach, FL, Dec. 28, 2002.

"Consumers Gain Immediate and Full Access to Credit Score Used by Majority of U.S. Lenders." PR Newswire, ProQuest Copy; Mar. 19, 2001; p. 1.

Announcing TrueProfiler; http://web.archive.org/web/20021201123646/http://www.truecredit.com/index.asp, dated Dec. 1, 2002, 2 pages.

Anonymous; "Credit-Report Disputes Await Electronic Resolution"; Credit Card News; Chicago: Jan. 15, 1993; vol. 5, Issue 19; p. 5.

Anonymous; "MBNA Offers Resolution of Credit Card Disputes"; Hempstead: Feb. 2002; vol. 68, Issue 2; p. 47.

Chores & Allowances. "Do Kids Have Credit Reports?" http://choresandallowances.blogspot.com/2007/10/do-kids-have-credit-reports.html Oct. 15, 2007 as printed May 31, 2011.

Collins, Michael; Exploring the Design of Financial Counseling for Mortgage Borrowers in Default, Mar. 13, 2007.

Credit Plus, Inc.; "Score Wizard" [online] [retrieved on Jun. 13, 2007] Retrieved from the internet http://web.archive.org/web/20030806080310/www.creditplus.com/scorewizard.asp Nov. 27, 2002 & Mar. 23, 2003.

Demby, Elayne; "Special Report: Letting Consumers Know the Score—and More", Collections and Credit Risk, New York, Feb. 2003, vol. 8, Issue 2, p. 53, 3 pgs.

Elliehausen et al.; The Impact of Credit Counseling on Subsequent Borrower Behavior, Dec. 31, 2007.

Ettore, Paul Kahn; on Exceptional Marketing, Management Review, vol. 38(11), Nov. 1994, pp. 48-51.

Expensr.com http://www.expensr.com/, as retrieved on Sep. 17, 2008.

Gibbs, Adrienne; "Protecting Your Children from Identity Theft," http://www.creditcards.com/credit-card-news/identity-ID-theft-and-kids-children-1282.php Nov. 25, 2008 as printed Jul. 5, 2011.

Hunt, Robert M.; Whither Consumer Credit Counseling?, Dec. 31, 2005.

ID Theft Assist; "Do You Know Where Your Child's Credit Is?" http://www.idtheftassist.com/pages/story14 Nov. 26, 2007, as printed May 31, 2011.

Ideon, Credit-Card Registry that Bellyflopped this Year, Is Drawing some Bottom-Fishers, The Wall Street Journal, Aug. 21, 1995, pp. C2.

Lee, W.A.; "Experian, on Deal Hunt, Nets Identity Theft Insurer", American Banker: The Financial Services Daily, 1pg., New York, NY, Jun. 4, 2003.

LifeLock; "How LifeLock Works," http://www.lifelock.com/lifelock-for-people, accessed Mar. 14, 2008.

LifeLock, "LifeLock Launches First ID Theft Prevention Program for the Protection of Children," Oct. 14, 2005 Press Release, posted on http://www.lifelock.com/about-us/press-room/2005-press-releases/lifelock-protection-for-children, accessed Mar. 14.

LifeLock; "How can LifeLock protect my kids and family?," http://www.lifelock.com/lifelock-for-people/how-we-do-it/how-can-lifelock-protect-my-kids-and-family, accessed Mar. 14, 2008.

Loshin; Intelligent Enterprise: Better Insight for Business Decisions, "Value-Added Data: Merge Ahead", Feb. 9, 2000, vol. 3, No. 3, 5 pages.

Magid, Lawrence, J.; Business Tools: When Selecting an ASP Ensure Data Mobility, Los Angeles Times, Feb. 26, 2001, vol. C, Issue 4, pp. 3, Los Angeles, CA.

Privacy Rights Clearinghouse: Identity Theft—"What to do if it happens to you" www.privacyrights.org (1999).

Ramaswamy, Vinita M.; Identity-Theft Toolkit, The CPA Journal, Oct. 1, 2006, vol. 76, Issue 10, pp. 66-70.

Rawe, Julie; "Identity Thieves", Time Bonus Section, Inside Business, Feb. 2002.

Stein; Benchmarking Default Prediction Models: Pitfalls and Remedies in Model Validation, Moody's KMV, Revised Jun. 13, 2002, Technical Report #020305; New York.

Truston; "Checking if your child is an ID theft victim can be stressful," as posted by Michelle Pastor on Jan. 22, 2007 at http://www.mytruston.com/blog/credit/checking_if_your_child_is_an_id_theft_vi.htmi.

Vamosi, Robert, "How to Handle ID Fraud's Youngest Victims," http://news.cnet.com/8301-10789_3-10105303-57.html Nov. 21, 2008 as printed May 31, 2011.

Waggoner, Darren J, Global Identity Crisis, Collections Credit Risk, Aug. 2001, vol. vol. 6, Issue No. 8.

* cited by examiner

Please Wait...

Locating Credit Card Accounts from your Credit History

FIG. 5

CARD REGISTRY SYSTEMS AND METHODS

CROSS-REFERENCE TO RELATED APPLICATIONS

This application is a continuation of, claims priority from, U.S. application No. 12/334,278, filed Dec. 12, 2008, now U.S. Pat. No. 8,127,986, which claims priority from U.S. Provisional Application No. 61/013,877, Filed Dec. 14, 2007, both of which are hereby incorporated by reference in their entirety.

BACKGROUND OF THE INVENTION

1. Field of the Invention

This invention relates to systems and methods for automating registry of consumer credit cards (and other financial cards) in a card registry service.

2. Description of the Related Art

Card registry services provide consumers with a repository for information associated with each of a plurality of credit cards that may be accessed when one or more of the credit cards are lost, stolen, or otherwise unavailable, and the consumer wishes to cancel the credit card(s). For example, a consumer may provide information regarding each of their credit cards, including, for example, a card issuer, card number, full name on card, security code on card, and contact information for the card issuer to a card registry service. When the consumer wants to cancel one or more of the registered credit cards, the consumer retrieves the card information from the card registry services and cancels the cards using that information or a customer service representative of the card registry service may help consumer review the registered cards and initiate cancellation of the cards.

SUMMARY OF THE INVENTION

In one embodiment, a card registry service provides a card registry computing system (also referred to herein as a "card registry system") for storing information regarding one or more credit cards for each of a plurality of consumers and, when a consumer contacts the credit card registry service, either by phone, fax, or via an Internet-accessible user interface, for example, the credit cards associated with the particular consumer are determined and the credit card accounts are cancelled electronically by the card registry system or by a fraud prevention representative. In one embodiment, the card registry system is configured to automatically populate a consumer's card registry account with credit card account information retrieved from the consumer's credit file.

In general, a card registry system receives information regarding one or more financial cards, which may include credit, debit, retail store loyalty, ATM, and any other available financial cards, of the consumer so that the card information is available when one or more of the registered cards becomes unavailable (e.g., one or more cards may be lost, stolen, or otherwise compromised). In one embodiment, the consumer provides relevant information regarding the financial cards to be registered with the credit registry service into one or more web interfaces or forms, such as via a keyboard, mouse, and/or microphone, for example. This process can be quite tedious and prone to typographical errors or errors in communication card information, however, especially as the number of cards associated with the consumer increases. Additionally, if a consumer has lost a purse or wallet, the time required to compile and enter the information necessary to register each of the consumer's financial cards may increase the risk of fraudulent use of the financial cards. Accordingly, in an advantageous embodiment, a card registry system is configured to automatically identify financial card information in one or more credit files associated with the consumer and populate the consumer's card registry account with the identified financial card information. For example, if the consumer is enrolled in a credit monitoring service that periodically accesses the consumer's credit file from one or more credit bureaus, information regarding open credit card accounts of the consumer may be extracted from a credit file of the consumer.

In one embodiment, a credit file of the consumer is accessed when the consumer initially enrolls in the card registry service, which may be well before cancellation of any of the registered cards is necessary. In another embodiment, the consumer's enrollment in the card registry service does not immediately initiate retrieval of credit card information from the consumer's credit file. Rather, the card registry service accesses the consumer's credit file when cancellation of cards is initiated by the consumer, such as in response to the consumer losing one or more financial cards. Because the financial card information is electronically accessed from the member's credit file(s), the integrity of the accessed data is increased when compared to manual entry methods that commonly result in typographical and/or communication errors, especially when entering lengthy numeric strings.

In one embodiment, information regarding financial cards that are not listed on a credit file, e.g., debit and/or ATM card, is provided by the consumer via a web interface of the card registry system, for example. In other embodiments, however, information regarding debit and/or ATM cards may be automatically retrieved from services provided by the card registry service and/or affiliates of the card registry service, such as a debit account monitoring service, for example. In one embodiment, debit and/or ATM card information identified in one or more debit reports associated with the consumer is stored in the consumer's card registry account. In other embodiments, other data sources may be accesses in order to automate registration of financial cards with a consumer's card registry account.

In one embodiment, consumers that subscribe to other credit-related services offered by the card registry service provider and/or affiliates of the provider, such as credit monitoring services or other credit or non-credit related services, may easily register with the card registry system with a single click on a webpage of the related service provider. For example, a member of a single or multi-bureau credit monitoring service may easily enroll in the card registry system with a single click on an enrollment button, for example, on the member's account information (or other) page. In another example, a member of a non-credit related product, such as a warranty product, may likewise easily enroll in the card registry system. Thus, in this embodiment, the process of enrolling a consumer in a credit registry service is simplified by using the consumer's member information that has previously been supplied by the consumer in opening the related credit monitoring account.

BRIEF DESCRIPTION OF THE DRAWINGS

FIG. 5 illustrates an exemplary user interface that may be displayed to the consumer in response to the consumer indicating a desire to view and/or cancel one or more financial cards.

DETAILED DESCRIPTION OF THE PREFERRED EMBODIMENT

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1A:
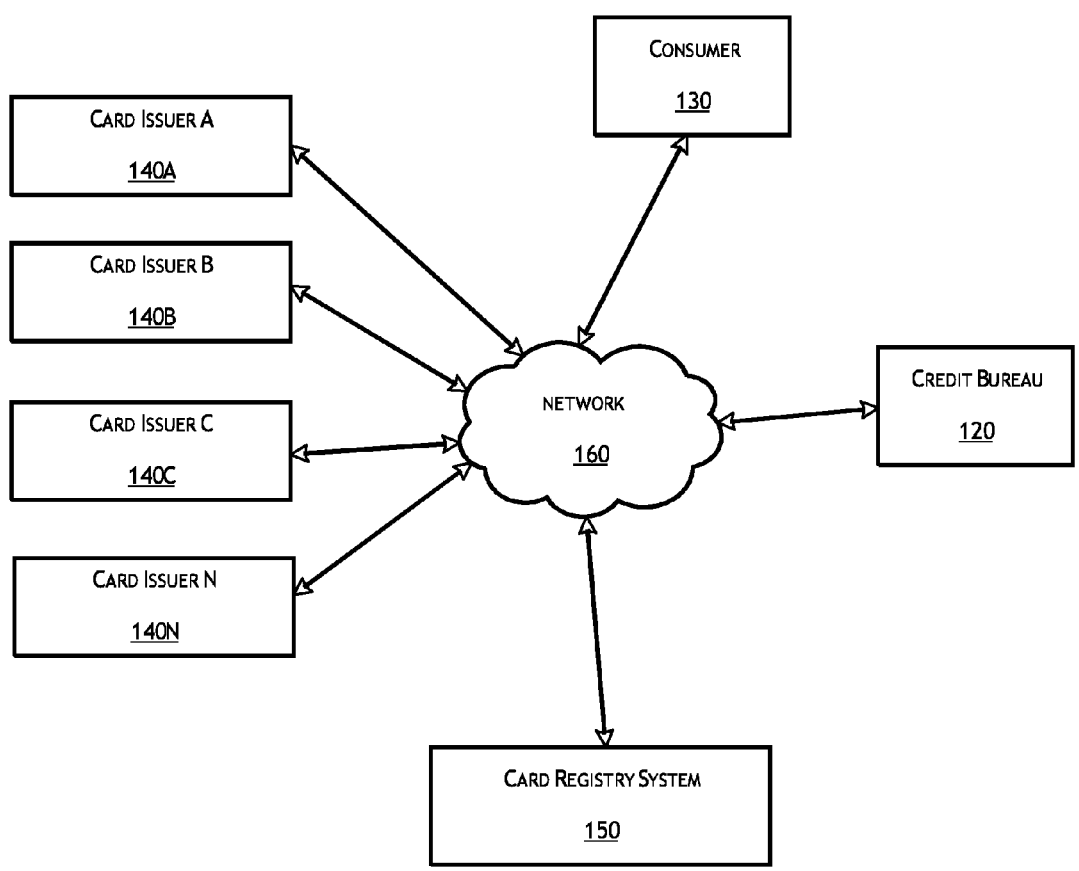
FIG. 1A is a block diagram illustrating one embodiment of a card registry system in communication with a credit bureau, a consumer, and one or more financial card issuers.

FIG. 1A is a block diagram illustrating one embodiment of a card registry system 150 in communication with a credit bureau 120, a consumer 130, and one or more financial card issuers 140 (including card issuer 140A, card issuer 140B, card issuer 140C, and card issuer 140N). In one embodiment, the system outlined in FIG. 1A is computerized, wherein each of the illustrated components comprises a computing device that is configured to communicate with other computer devices via a network 160. For example, the consumer 130 may comprise a computing device, such as a desktop, notebook, or handheld computing device that is configured to transmit and receive data to/from other computing devices via the network 160. Similarly, each of the card issuers 140, the credit bureau 120, and the card registry system 150, may include one or more computing devices that are configured to communicate data with other computing devices via the network 160. Depending on embodiment, the network 160 may comprise one or more of any type of network, such as one or more local area networks, wide area networks, personal area networks, telephone network, and/or the Internet, which may be accessed via any available wired and/or wireless communication protocols. Thus, the network 160 of FIG. 1A may comprise a secure LAN through which the card registry system 150 and the credit bureau 120 communicate, and the network 160 may further comprise an Internet connection through which the card registry system 150 and the consumer 130 communicate. In another embodiment the network 160 comprises one or more telephone networks, whether wireless or wired, that carries voice communications between the consumer 130 and a representative of the card registry system 150, for example. Any other combination of networks, including secured and unsecured network communication links, are contemplated for use in the systems described herein.

Figure 1B:
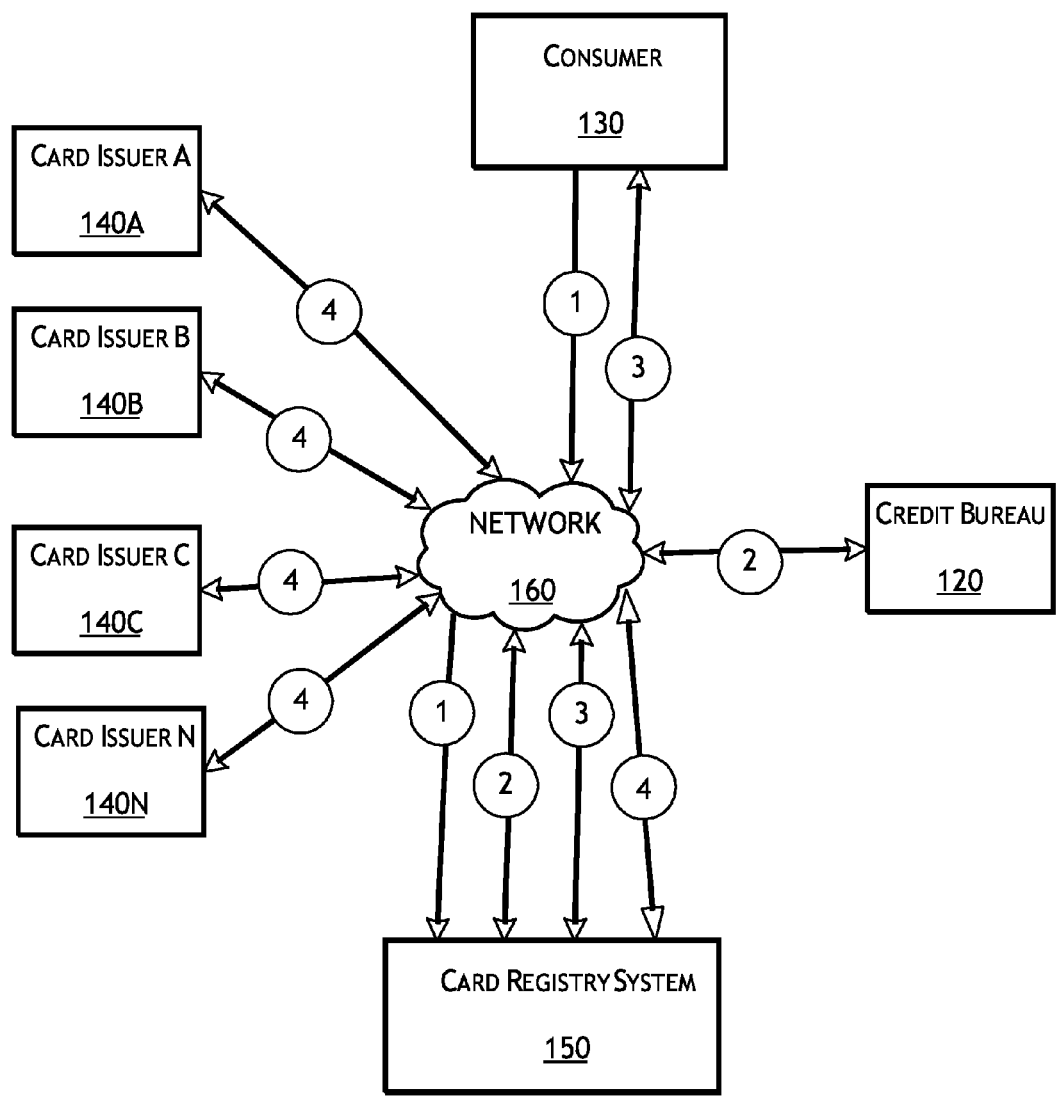
FIG. 1B is a block diagram illustrating another embodiment of a card registry system in communication with a credit bureau, a consumer, and one or more financial card issuers, where an exemplary temporal flow of data is outlined.

FIG. 1B is a block diagram illustrating another embodiment of the card registry system 150, the credit bureau 120, the consumer 130, and the financial card issuers 140 of FIG. 1A, where an exemplary temporal flow of data is outlined. In particular, the circled numerals of FIG. 1B illustrate the order in which data flows between the various components of FIG. 1B according to one embodiment. In other embodiments, the steps outlined by the circled numerals may be performed in a different order, and the method may include fewer or additional steps.

In step one of FIG. 1B, the card registry system 150 receives information from the consumer 130 that allows the card registry system 150 to access a credit file of the consumer 130. For example, the card registry system 150 may receive information from the consumer 130 that is provided to the card registry system 150 as part of an enrollment process in a credit monitoring service. In this embodiment, the card registry system 150 may be controlled by a credit monitoring service and the card registry account may be linked to a credit monitoring account of the consumer 130. Alternatively, in another embodiment in the consumer 130 may establish a card registry account with the card registry system 150 without previously having established a credit monitoring account with the card registry system 150. For example, the consumer 130 may establish a card registry account with the card registry system 150 in response to the consumer 130 needing to urgently cancel one or more financial cards, such as may be desired if the consumer 130 loses a purse or wallet that holds the financial cards. In other embodiments, the card registry system 150 may be controlled and/or incorporated into other services provided by a credit bureau or any other entity. Depending on the embodiment, the consumer may pay either a monthly or annual membership fee for their enrollment in the credit registry service and the membership fee may be billed immediately upon the enrollment, or may be billed periodically. In one embodiment, the card registry service provides a reimbursement guarantee indicating that a registered member will be reimbursed certain or all unauthorized charges that are not covered by the respective card issuers. Such a guarantee may only apply to members that enrolled in the card registry service some predetermined time period (e.g., a day, a month, or six months) prior to needing to use the cancellation/reissuance service. Thus, such a guarantee may motivate consumers to enroll in the card registry service well before they need the cancellation/reissuance service, if ever.

Moving to step two of FIG. 1B, in response to the consumer 130 indicating that one or more financial cards of the consumer 130 should be canceled, the card registry system 150 accesses a credit file of the consumer 130 from any one or all of the credit bureaus 120. The credit file may comprise a credit file from a single credit bureau or a credit file comprising credit data from more than one credit bureau, such as a tri-bureau report. The card registry system 150 may then analyze the credit file and extract credit card account information from the retrieve credit file. In an embodiment where the consumer 130 is already enrolled in a credit monitoring service prior to requesting cancellation of one or more financial cards, the card registry system 150 may access a pre-retrieved copy of the consumer credit file, rather than requesting a current copy of the credit file from the credit bureau 120. Furthermore, if the consumer is enrolled in a credit monitoring service, the card registry system 150 may analyze previous credit files of the consumer, in addition to a current credit file, in an attempt to identify as many of the consumer's credit cards as possible. After extracting the credit card information from the credit file, the card registry system 150 may initiate cancellation of one or more of the identified credit cards. A "credit file," as used herein, includes any data that is stored by a credit bureau, including any information that is included in a consumer credit report, any subset of that information, and/or any other credit data.

Next, in step three the consumer 130 is given the opportunity to add financial cards to the consumer's card registry account that may not have been identified in the consumer's credit file. For example, the consumer may have debit cards, ATM cards, retail store loyalty cards, and/or other financial cards that are not included in a credit file. Thus, the consumer 130 may desire to include these other financial cards in their card registry account so that the financial cards may also be canceled and reissued by the card registry system 150. In one embodiment, the card registry system 150 communicates with devices other than the credit bureau 120 in order to identify financial cards associated with the consumer 130. For example, the card registry system 150 may communicate with a debit reporting service in order to receive information regarding debit accounts associated with the consumer 130. In step three, the consumer 130 is also given the opportunity to select one or more of the identified financial cards for cancellation and possibly reissuance. In another embodiment, all of the financial cards are selected for cancellation as a default and the consumer 130 is given the opportunity to unselect any of the financial cards (maybe not all of the financial cards were in a lost purse that is the catalyst for initiating cancellation of cards). In another embodiment, the consumer may establish groups of financial cards, such as cards that are used by the consumer, those that are only used by a spouse of the consumer, etc., so that one or more groups of financial cards may be selected or unselected for cancellation or reissuance.

In step four of FIG. 1B, the card registry system initiates cancellation of the selected financial cards of the consumer 130. If the consumer has requested cancellation of financial cards from multiple issuers, the card registry system 150 initiates communications with each of those card issuers 140 in order to expedite cancellation of the indicated financial cards. In one embodiment, the cancellation process is automated by the card registry system 150. For example, the card registry system 150 may have established relationships with each of the card issuers 140 such that an electronic cancellation request may be transmitted from the card registry system 150 to a particular card issuer 140 in order to initiate cancellation of one or more of financial cards of the consumer 130 that are held by that card issuer 140. In another embodiment, a fraud resolution or customer service representative with access to the card registry system 150 manually contacts each of the card issuers 140 associated with the financial cards selected for cancellation by the consumer 130. For example, the customer service representative may contact a card issuer 140 via telephone, fax, e-mail, or other means, in order to communicate a cancellation requests on behalf of the consumer 130 to the relevant card issuer 140. In one embodiment, cancellation of certain financial cards may be initiated electronically via direct communication between the card registry system 150 and the associated card issuer 140, while other financial cards of the consumer 130 may be canceled by phone, fax, email, or other communication between the customer service representative and a representative at the associated card issuer 140.

Figure 2:
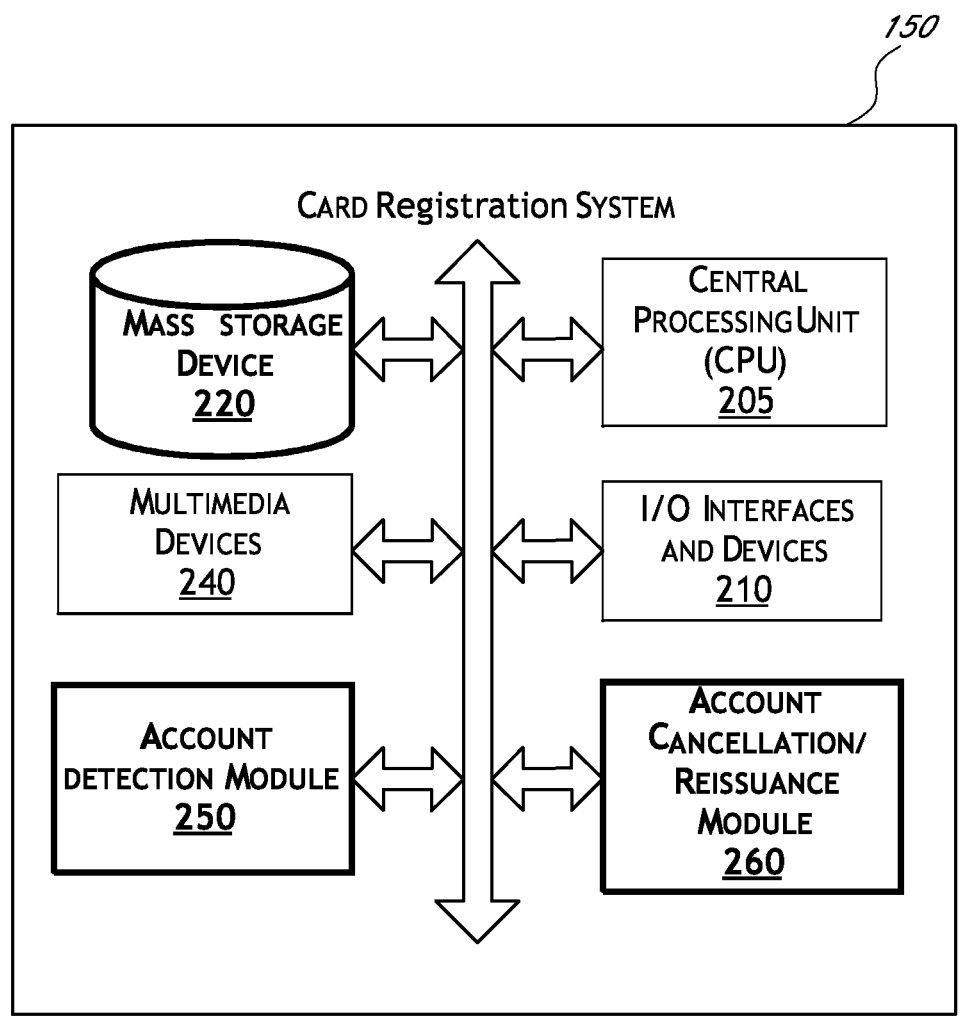
FIG. 2 is a block diagram illustrating one embodiment of a card registry system.

FIG. 2 is a block diagram illustrating one embodiment of the card registry system 150. In one embodiment, the card registry system 150 is configured to interface with multiple devices and/or data sources, such as in the exemplary network configurations of FIGS. 1A and 1B. The card registry system 150 may be used to implement certain systems and methods described herein. For example, in one embodiment the card registry system 150 may be configured to access credit files of consumers, identify credit card accounts (and/or other financial cards) included in the credit files, and initiate cancellation and reissuance of the identified credit card accounts based on the information regarding the credit card accounts that is located in the credit file. The functionality provided for in the components and modules of the card registry system 150 may be combined into fewer components and modules or further separated into additional components and modules.

In general, the word module, as used herein, refers to logic embodied in hardware or firmware, or to a collection of software instructions, possibly having entry and exit points, written in a programming language, such as, for example, C, C++, or C#. A software module may be compiled and linked into an executable program, installed in a dynamic link library, or may be written in an interpreted programming language such as, for example, BASIC, C++, JavaScript, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In one embodiment, the card registry system 150 includes, for example, a server or a personal computer that is IBM, Macintosh, or Linux/Unix compatible. In another embodiment, the card registry system 150 comprises a laptop computer, smart phone, personal digital assistant, or other computing device, for example. In one embodiment, the exemplary card registry system 150 includes a central processing unit ("CPU") 205, which may include one or more conventional or proprietary microprocessors. The card registry system 150 further includes a memory, such as random access memory ("RAM") for temporary storage of information and a read only memory ("ROM") for permanent storage of information, and a mass storage device 220, such as a hard drive, diskette, or optical media storage device. In certain embodiments, the mass storage device 220 stores card registry account information, such as financials card information associated with financial cards of respective consumers. In one embodiment, the financial card information includes information regarding a card issuer that may be used to initiate cancellation of the respective financial card, among other information that uniquely identifies a particular financial card. In one embodiment, the card issuer information is retrieved from a credit file of the consumer so that the consumer is not required to manually provide the card issuer information. Typically, the modules of the card registry system 150 are in communication with one another via a standards based bus system. In different embodiments, the standards based bus system could be Peripheral Component Interconnect (PCI), Microchannel, SCSI, Industrial Standard Architecture (ISA) and Extended ISA (EISA) architectures, for example.

The card registry system 150 is generally controlled and coordinated by operating system and/or server software, such as the Windows 95, 98, NT, 2000, XP, Vista, Linux, SunOS, Solaris, PalmOS, Blackberry OS, or other compatible operating systems. In Macintosh systems, the operating system may be any available operating system, such as MAC OS X. In other embodiments, the card registry system 150 may be controlled by a proprietary operating system. Conventional operating systems control and schedule computer processes for execution, perform memory management, provide file system, networking, and I/O services, and provide a user interface, such as a graphical user interface ("GUI"), among other things.

The exemplary card registry system 150 may include one or more commonly available input/output (I/O) interfaces and devices 210, such as a keyboard, mouse, touchpad, and printer. In one embodiment, the I/O devices and interfaces 210 include one or more display device, such as a monitor, that allows the visual presentation of data to a user. More particularly, a display device provides for the presentation of GUIs, application software data, and multimedia presentations, for example. The card registry system 150 may also include one or more multimedia devices 240, such as speakers, video cards, graphics accelerators, and microphones, for example. In one embodiment, the I/O interfaces and devices 210 comprise devices that are in communication with modules of the card registry system 150 via a network, such as the network 160 and/or any secured local area network, for example.

In the embodiment of FIG. 2, the I/O devices and interfaces 210 provide a communication interface to various external devices. For example, in this embodiment the card registry system 150 is in communication with a network 160, such as any combination of one or more LANs, WANs, or the Internet, for example, via a wired, wireless, or combination of wired and wireless, connections via a network interface of the I/O devices and interfaces 210.

In the embodiment of FIG. 2, the card registry system 150 also includes two application modules that may be executed by the CPU 105. More particularly, the application modules include an account detection module 250 and an account cancellation/reissuance module 260. In one embodiment, the account detection module 250 is configured to access a credit file of the consumer 130 and to identify credit card account information within the credit file. For example, the consumer may have several different credit cards from different issuers. A credit file of the consumer 130 should include information on each of these issued credit cards. Thus, the account detection module, using document parsing technology, may scan the credit files (or only the relevant portions of the credit file or other credit information) for information associated with open credit card accounts. In one embodiment, the account detection module 250 identifies only the open credit card accounts, as a credit file may indicate credit card accounts that are closed and would not require cancellation. In a similar way, the account detection module may access other records associated with the consumer 130 in order to identify debit, retail loyalty, or other financial cards associated with the consumer 130. In one embodiment, the account detection module 250 also communicates with a card issuer information source that contains information necessary for cancellation of financial cards that may not be included on a credit file. For example, a card issuer information source may comprise a database that provides detailed information regarding contacts and/or requirements for canceling respective credit cards. In one embodiment, the contact information in the card issuer information source may comprise a secure FTP address, IP address, email address, or any other electronic communication address that may be used by the card registry system 150 in requesting cancellation of a credit card. Thus, the account detection module 250 may be configured to identify credit cards associate with the consumer 130, and the information necessary to initiate cancellation of the credit cards, with little or minimal input from the consumer 130.

The account cancellation/reissuance module 260 is configured to communicate with one or more card issuers 140 in order to initiate cancellation of financial cards that are issued by respective card issuers 140. As noted above, the account cancellation/reissuance module 260 may communicate electronically with some or all of the card issuers 140 in order to communicate a cancellation request to the respective card issuers 140. In another embodiment, the account cancellation/reissuance module 260 may provide information that is usable by a customer service representative in order to initiate cancellation of financial cards, such as by telephone or fax. In one embodiment, the account cancellation/reissuance module 260 also initiates reissuance of financial cards from card issuers 140. If the consumer 130 loses a purse or wallet, for example, that contains multiple financial cards the consumer may not only wish to cancel all of the lost financial cards, but may also be interested in immediately reissuing each (or some) of the financial cards, such as with new account numbers. Thus, the account cancellation/reissuance module 260 may be configured to request both cancellation and reissuance of financial cards from the card issuers 140.

Figure 3:
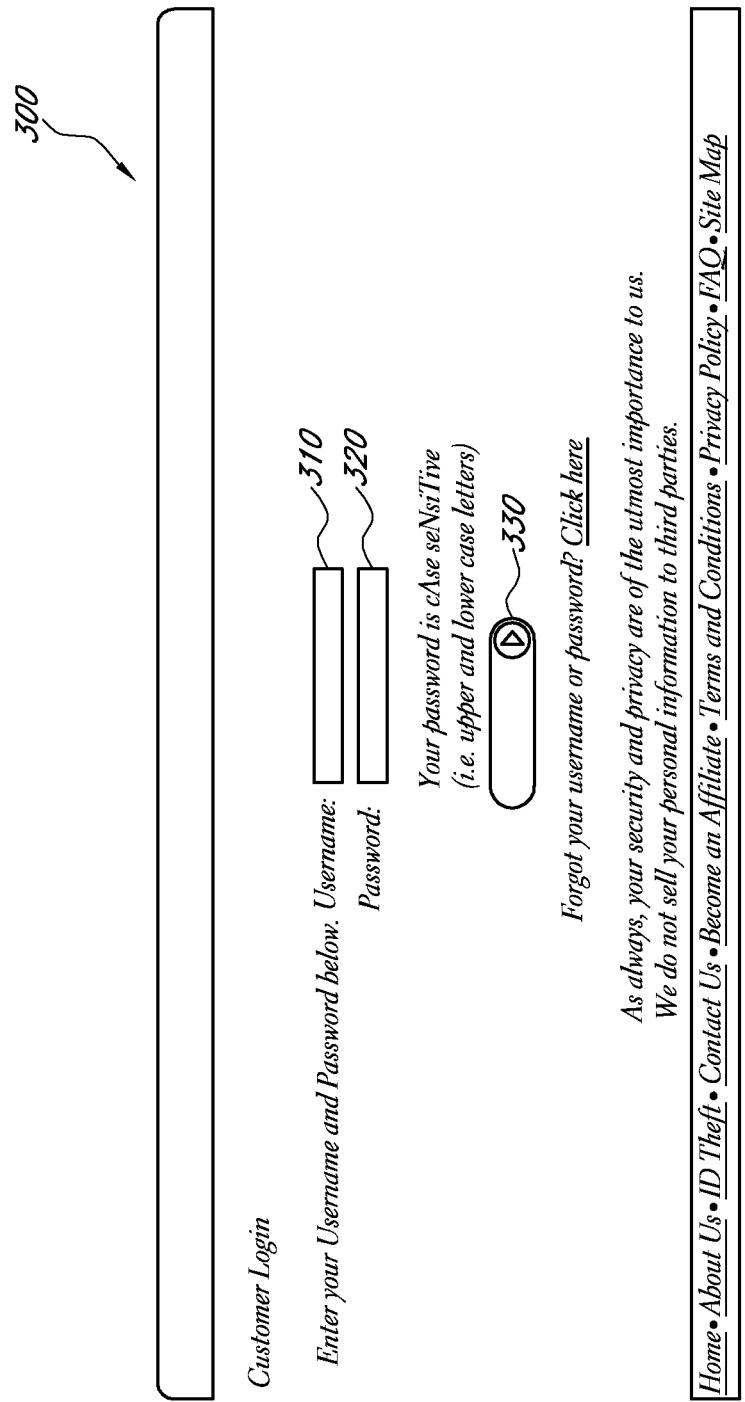
FIG. 3 illustrates an exemplary user interface that may be used by a consumer to log in to the consumer's card registry account, and/or other financial service account offered by the card registry provider.

FIG. 3 illustrates an exemplary user interface 300 that may be used by a consumer to log into the consumer's card registry account, and/or other financial service account offered by the card registry provider. In embodiment of FIG. 3, the user interface 300 comprises a username entry field 310 and a password entry field 320, as well as a login button 330. In this embodiment, the consumer enters their chosen (or assigned) username in the text entry field 310 and the associated password in the password entry field 320, followed by selecting the login button 330, in order to initiate access to the consumer's account. In one embodiment, the user interface 300 allows the consumer access to a credit monitoring service, which may include a card registry service such as that described above with reference to FIGS. 1-2. In other embodiments, a user interface similar to that of FIG. 3 may be used to provide the consumer direct access to a card registry service, without the consumer having previously enrolled in a credit monitoring service. In other embodiments, the consumer may access the card registry service using any other suitable user interface, or by other means such as via telephone, fax, or mail.

Figure 4:
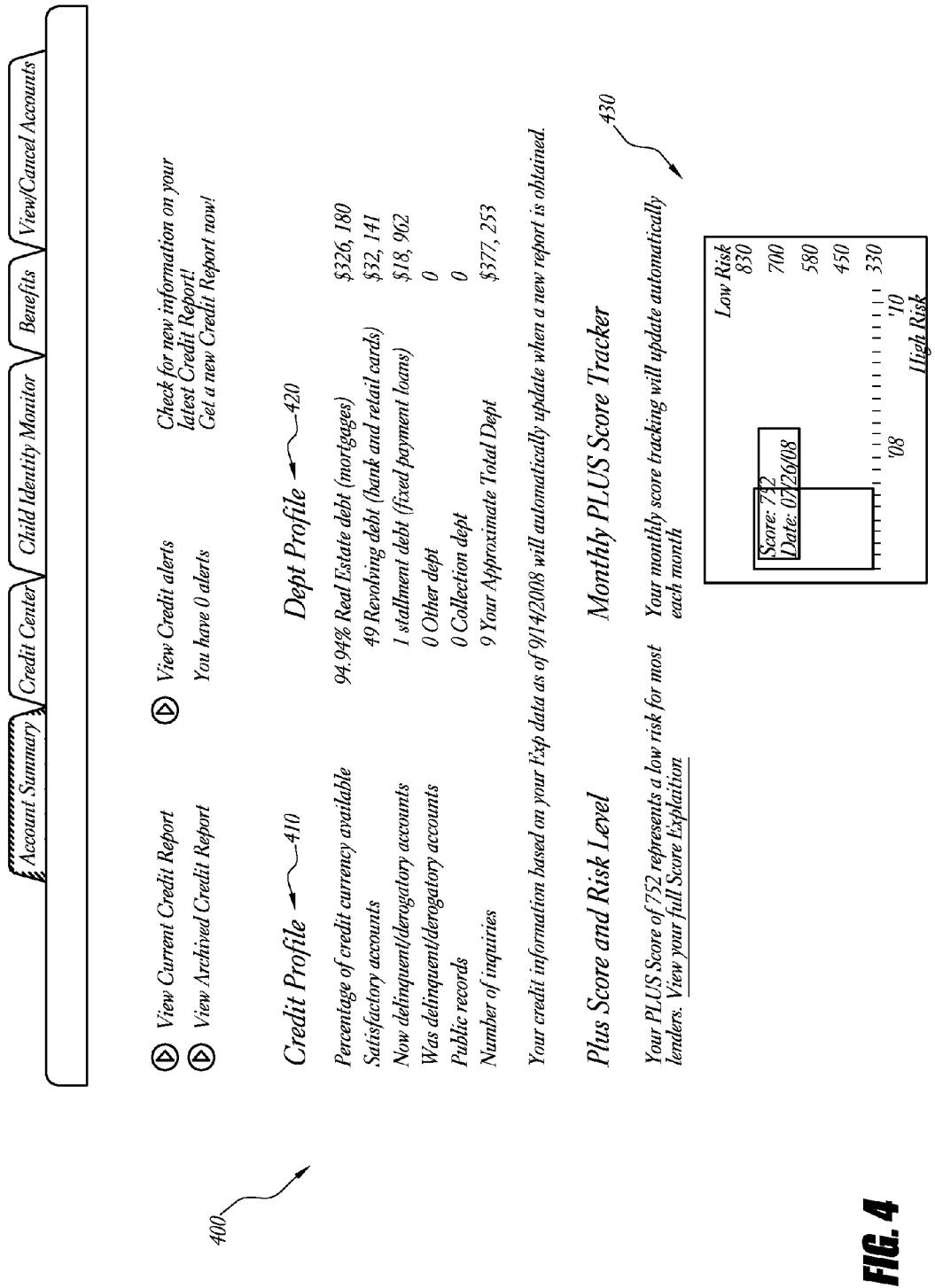
FIG. 4 illustrates an exemplary user interface for a credit monitoring service in which a consumer may enroll.

FIG. 4 illustrates an exemplary user interface for a credit monitoring service in which a consumer may enroll. For example, the user interface 400 may be part of an account summary page that is displayed to the consumer 130 after logging into their credit monitoring account. In other embodiments, the account summary page of a consumer's credit monitoring account may include additional or less information than the user interface of FIG. 4.

The exemplary user interface 400 includes a section summarizing the consumer's credit profile 410, a section summarizing the consumer's debt profile 420, and a section providing a credit score and credit score tracking for the consumer 430. Additionally, the user interface 400 includes links to other portions of the credit monitoring service, including a credit center tab 440, a child identity monitor tab 442, a benefits tab 444, and a view/cancel accounts tab 446. In other embodiments, a credit monitoring service may provide additional or fewer options to a consumer. In the particular embodiment of FIG. 4, the consumer may initiate the process of viewing and/or canceling financial cards by selecting the tab 446. In one embodiment, after selecting the tab 446, the card registry system 150 identifies financial cards associated with the consumer, allows the consumer to edit the identified cards and/or enter information regarding additional financial cards, and initiates cancellation and possibly reissuance of one or more of the financial cards.

FIG. 5 illustrates an exemplary user interface that may be displayed to the consumer in response to the consumer indicating a desire to view and/or cancel one or more financial cards. For example, if the consumer viewing the user interface 400 of FIG. 4 selects the view/cancel accounts tab 446, a user interface such as that the illustrated in FIG. 5 may be displayed to the consumer indicating that the card registry system 150, and more particularly, the account detection module 250 (FIG. 2), is analyzing the consumers credit file in order to identify credit card accounts that are listed there on. In one embodiment, the identification of credit card accounts in the consumer's credit file is performed in response to the consumer indicating a desire to view and/or cancel financial cards, such as by selecting the tab 446 of FIG. 4. In other embodiments, the card registry system 150 may identify credit card accounts in the credit file, or credit files, of the consumer on an ongoing basis, such as in response to receiving a periodic credit file from the credit bureau 120 as part of a credit monitoring service in which the consumer has enrolled.

Figure 6:
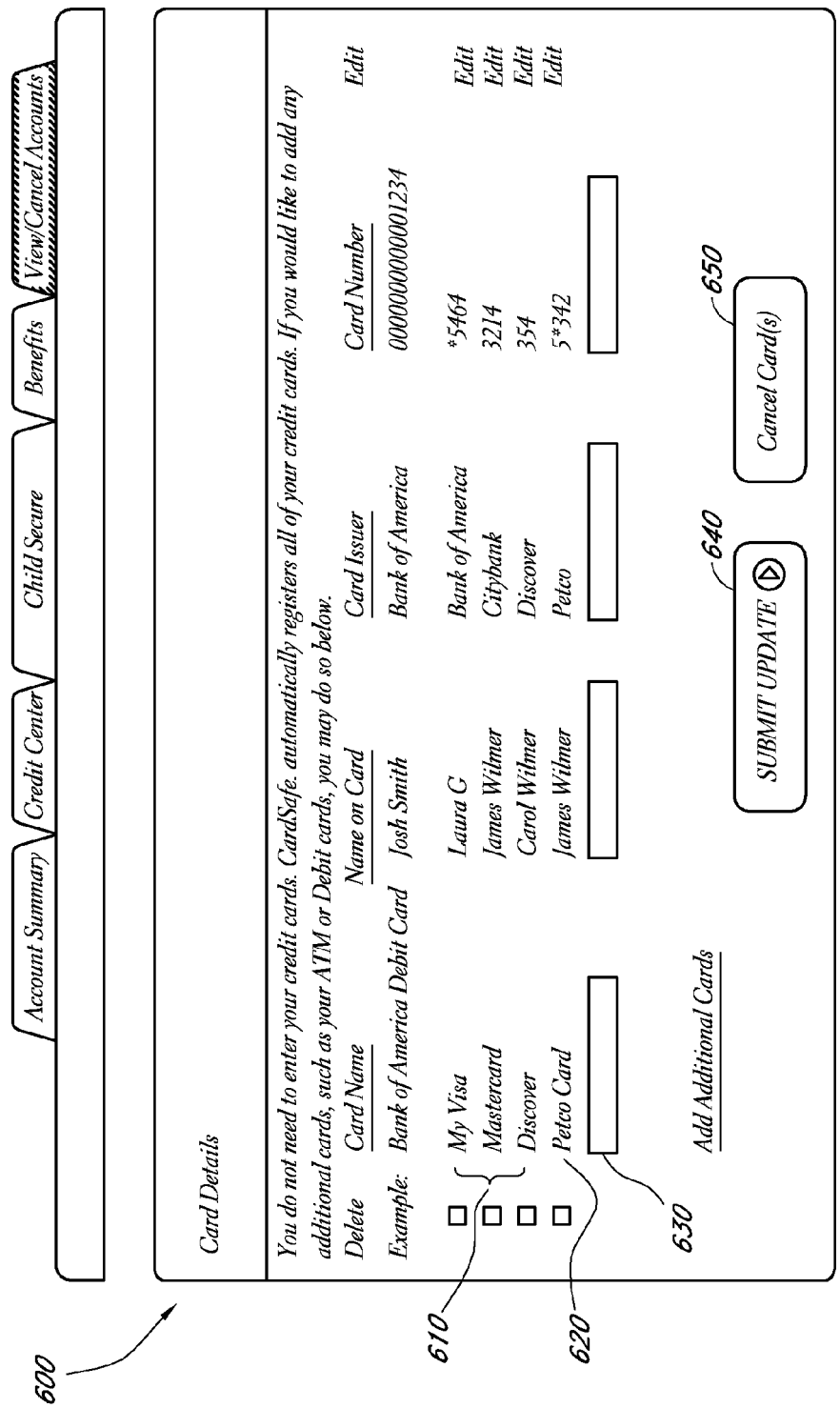
FIG. 6 illustrates an exemplary user interface that lists the financial cards associated with a particular consumer's card registry account.

FIG. 6 illustrates an exemplary user interface 600 that lists the financial cards associated with an exemplary consumer card registry account. The user interface 600 indicates credit card accounts 610 that have been identified in the consumer's credit file, as well as a store loyalty card 620 that may have been added to the consumers card registry account by the consumer. In addition to the information illustrated in FIG. 6 regarding each of the identified credit card accounts 610, the card registry system may also store information regarding details of communicating with respective card issuers in order to cancel and reissue the indicated credit cards. In the embodiment of FIG. 6, the user interface 600 includes an add account row 630 comprising text entry fields that allow the consumer to add additional financial cards to their card registry account. In this embodiment, the consumer simply clicks on one of the fields in the add account row 630 and then provides the requested information regarding the financial card. After the user has entered information regarding a new card in add account row 630, the consumer initiates storage of the new account information in the consumer's card registry account by selecting the submit update button 640. In other embodiments, other user interfaces may be used to receive information regarding financial cards that a consumer wishes to add to a card registry account.

The user-interface 600 also includes a cancel card(s) button 650 that may be selected to initiate cancellation and possibly reissuance (if the consumer desires reissuance) of one or more of the listed financial cards. In one embodiment, the cancel cards button 650, when selected, may initiate cancellation of all of the cards in the consumers card registry account. In another embodiment, selection of the cancel cards button 650 provides the consumer with another user interface (e.g., FIG. 7) that allows the consumer to select specific financial cards for cancellation and reissuance.

Figure 7:
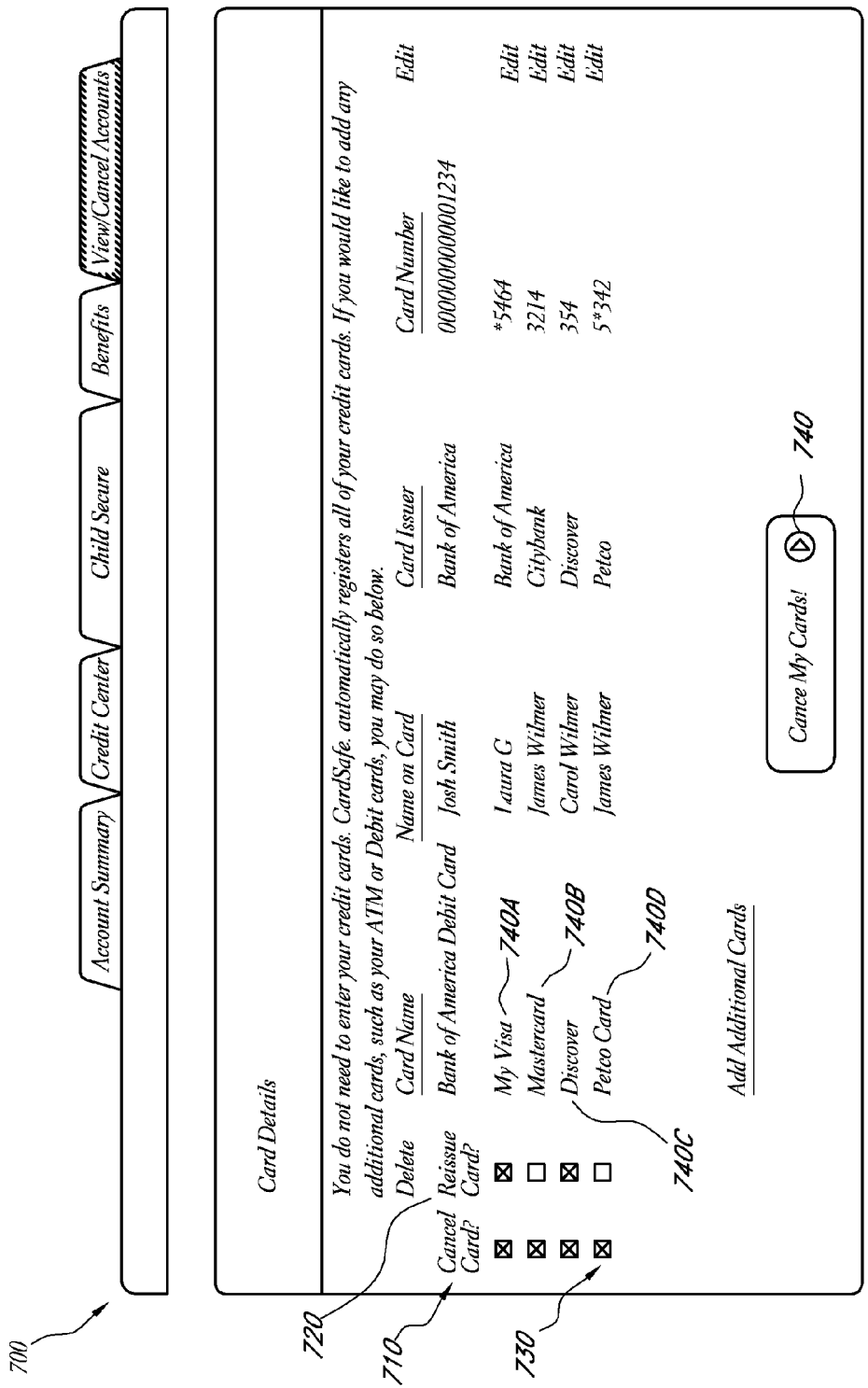
FIG. 7 illustrates an exemplary user interface that lists the financial cards associated with a particular consumer's card registry account, and provides controls that allow the consumer to select one or more of the financial cards for cancellation and possible reissuance.

FIG. 7 illustrates an exemplary user interface 700 that lists the financial cards associated with a particular consumer card registry account, and provides controls that allow the consumer to select one or more of the financial cards for cancellation and possible reissuance. In the embodiment of FIG. 7, in addition to listing the same information regarding the financial cards as on the user interface 600 (FIG. 6), the user interface 700 also includes a cancel card column 710 and a reissue card column 720, each of the columns comprising selectable controls (e.g., checkboxes) that are selectable by the consumer in order to indicate the cards the consumer is interested in canceling and reissuing. In this embodiment, each of the cancel and re-issue columns 710, 720 includes a select all checkbox 730 that may be selected by the consumer in order to mark each of the checkboxes in the respective column as selected. In one embodiment, the user interface 700 defaults to selecting the cancel card checkbox for each of the listed financial cards, while in other embodiments the user interface 700 defaults to selecting none of the cancel card checkboxes for the listed financial cards.

In the particular embodiment of FIG. 7, the consumer has selected each of the four cards 740A, 740B, 740C, and 740D for cancellation. The consumer has selected only the financial card 740A and 740C for reissuance. Thus, the card registry system 150, and more specifically the account cancellation/reissuance module 260, will initiate cancellation of each of the listed financial cards 740, and will additionally initiate reissuance of financial cards 740A and 740C. In the embodiment of FIG. 7, the consumer confirms the cancellation and reissuance instructions that are indicated by selection of appropriate checkboxes in columns 710, 720, by selecting the cancel my cards button 740. In response to selecting button 740, the card registry system initiates cancellation and reissuance of the financial cards as indicated by the consumer in user interface 700, for example.

As noted above, the steps taken in initiating cancellation and reissuance of financial cards may vary between different consumers, card issuers, and embodiments of the card registry system 150. For example, in one embodiment the account cancellation/reissuance module 260 may automatically send electronic cancellation and reissuance requests to the card issuers of the respective credit cards that have been selected for cancellation and reissue. In another embodiment, a customer service representative may receive a report indicating one or more financial cards that the consumer would like to cancel, and zero or more cards that the consumer would like to be reissued. For example, in response to the consumer selecting the button 740 such a report may be generated and provided to a customer service representative in order to allow the customer service representative to initiate the indicated cancellations and reissuances by contacting the corresponding financial card issuers, such as by telephone, fax, e-mail, or any other suitable communication with the respective card issuers.

Figure 8:
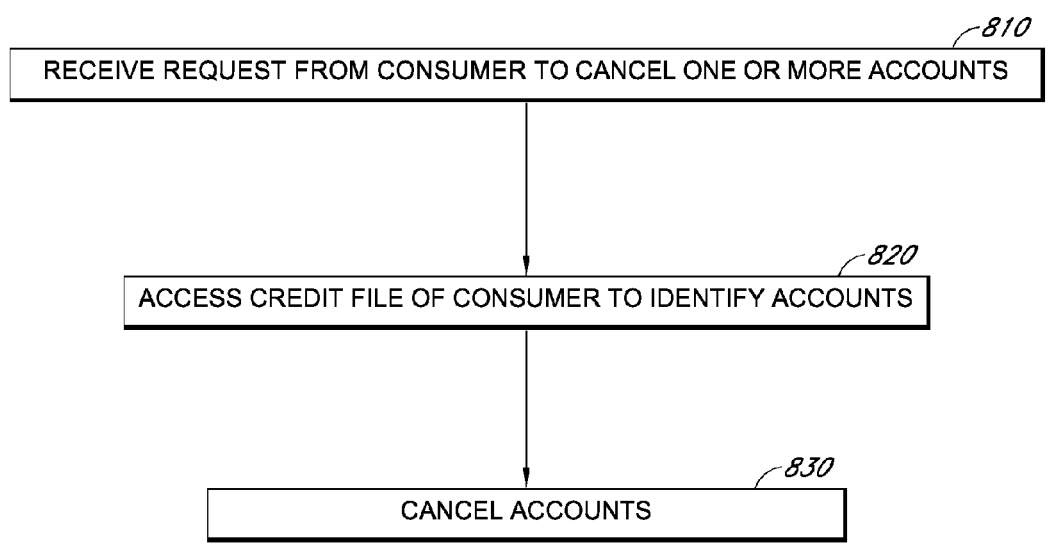
FIG. 8 is a flowchart illustrating one embodiment of a method of canceling financial cards of a consumer.

FIG. 8 is a flowchart illustrating one embodiment of a method of canceling financial cards of a consumer. The blocks of FIG. 8 may be performed by the card registry system 150, for example, or any other suitable computing device. Depending on the embodiment, the method of FIG. 8 may include fewer or additional blocks and blocks may be performed in a different order than is illustrated.

Beginning in block 810, the card registry system 150 receives a request from a consumer to cancel one or more financial cards. In one embodiment, the consumer is already registered with another service offered by the card registry provider. For example, the consumer may be enrolled in a credit monitoring service that is provided by the provider of the card registry service. In another embodiment, the consumer may not be enrolled in another service offered by the card registry provider, and may be required to enroll in such a service in block 810, or provide sufficient identification and authorization information to the card registry system 150 in order to allow the card registry system 152 access the consumer's credit file.

Next, in block 820 the credit file of the consumer is accessed and credit cards associated with the consumer are identified on the credit file. The information regarding the identified credit cards may be extracted and stored in a card registry account for the consumer. In one embodiment, the extraction of credit card information from a credit file of the consumer occurs in response to the consumer indicating their desire to cancel one or more financial cards. In another embodiment, the identification of credit card information in a credit file is performed prior to receiving an indication from the consumer of a desire to cancel one or more financial cards, such as part of a normal credit monitoring service.

Next, in block 830 cancellation of one or more of the credit cards identified in the consumer credit file is initiated. As discussed above, the consumer may be given an opportunity to select which cards of the identified credit cards should be canceled, such as via a web accessible user interface or a telephone call with a customer service representative. Additionally, the consumer may be provided an opportunity to select one or more of the credit cards for reissuance after the respective credit cards are canceled. In one embodiment, the card registry system 150 automates the cancellation and reissuance process by communicating directly with the corresponding card issuers.

In the embodiments described above with reference to FIGS. 6-8, for example, the identification and cancellation of multiple credit cards associates with a consumer may be quickly and accurately performed. Additionally, the consumer is not required to locate credit card information in their personal files in order to initiate cancellation of their credit cards.

Figure 9:
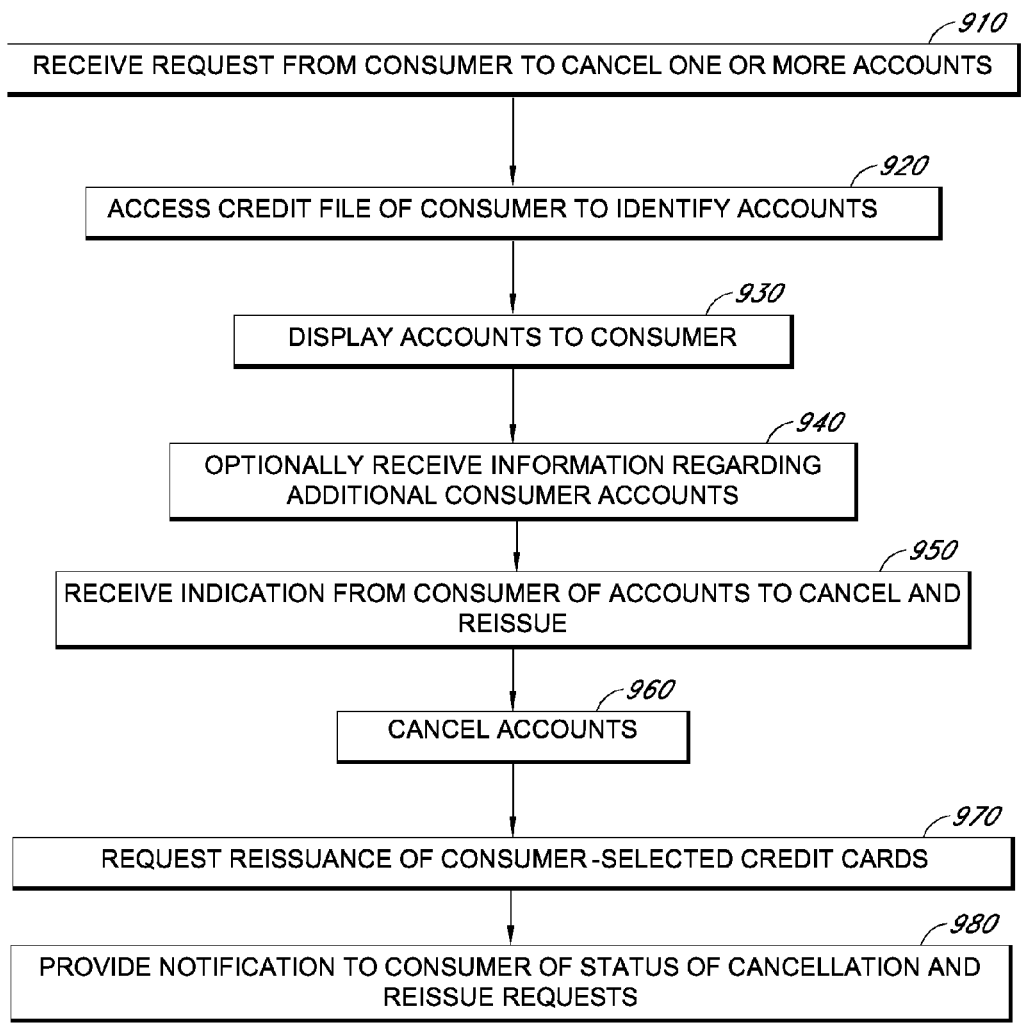
FIG. 9 is a flowchart illustrating another embodiment of a method of canceling financial cards of a consumer.

FIG. 9 is a flowchart illustrating another embodiment of a method of canceling financial cards of a consumer. The blocks of FIG. 9 may be performed by the card registry system 150, for example, or any other suitable computing device. Depending on embodiment, the method of FIG. 9 may include fewer or additional blocks and blocks may be performed in a different order than is illustrated.

Beginning in block 910, the card registry system 150 receives a request from a consumer to cancel one or more financial cards. As noted above, the request may come from a consumer that is already enrolled in a financial service offered by the same entity that controls the card registry system 150, or the request may be received from a consumer that is not enrolled in such a service.

Next, in block 920 a credit file of the consumer is accessed and one or more credit card accounts, and possibly other types of accounts, are identified in the credit file.

In block 930, the identified credit card accounts are displayed to the consumer, such as in a web accessible user interface. In other embodiments, the located accounts may be displayed to a customer service representative that is speaking to the consumer on the phone, for example.

Continuing to block 940, the card registry system 150 optionally receives information regarding additional consumer accounts, such as debit accounts, store loyalty accounts, ATM accounts, or any other account that the consumer may be interested in canceling. Information regarding the additional consumer accounts may be received via a web accessible user interface, for example, or may be entered into a standalone software application by a customer service representative or by the consumer.

In block 950, the card registry system 150 receives indications from the consumer of accounts to cancel and reissue. For example, the user may select one or more of the identified and/or manually added financial cards for cancellation via a web accessible user interface (see, e.g., FIG. 7). Additionally, the user may also indicate which of the accounts selected for cancellation should be reissued to the consumer.

Next, in block 960, the card registry system 150 initiates cancellation of the selected accounts. As noted above, cancellation may be initiated in various manners, such as electronically by a communication sent from the card registry system 150 to respective issuers, phone, fax, or e-mail communications between a customer service representative and the respective card issuers, or any other suitable method of communicating a cancellation request to the respective issuers.

In block 970 the card registry system 150 requests reissuance of consumer selected credit cards, if any. As noted above, the consumer may wish to have one or more of his/her soon-to-be-canceled credit cards immediately reissued. Thus, the card registry system 150 may automate the process of requesting reissuance of financial cards. Issuance of credit cards or other financial cards may be initiated in various manners, such as electronically by a communication sent from the card registry system 150 to respective issuers, phone, fax, or e-mail communications between a customer service representative and the respective card issuers, or any other suitable method of communicating a reissuance request to the respective issuers.

In block 980, the card registry system provides notification to the consumer of the status of the selected cancellation and reissuance requests. In one embodiment, the card registry system 150 provides a substantially real-time indication to the consumer of the status of the consumer's cancellation and reissuance requests, such as via a web interface that is provided to the consumer with an a few seconds to a few minutes after the consumer authorizes the cancellation of the cards. The time required for cancellation and reissuance of financial cards may vary depending on several factors, including the respective card issuer, the time of day the cancellation or reissuance request is received, the type of financial card, and/or the manner in which the cancellation or reissuance request is transmitted to the respective issuer. Thus, in one embodiment of the card registry system 150 provides periodic updates, such as every 10 minutes, 20 minutes, 30 minutes, hour, day, or other time, to the consumer with updated information on each of the cancellation and reissuance requests. The notification may be provided in any suitable format, such as via a user interface of a credit monitoring web site or card registry website, e-mail, text message, voicemail, or regular mail, for example.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re- defined herein to be restricted to including any specific characteristics of the features or aspects of the invention with which that terminology is associated. The scope of the invention should therefore be construed in accordance with the appended claims and any equivalents thereof

What is claimed is:
1. A method comprising:
accessing personal information of a consumer;

storing the personal information of the consumer in one or more storage devices;

transmitting to a credit bureau a credit file request including at least some of the personal information;

receiving a credit file of the consumer, the credit file comprising information regarding one or more credit cards issued to the consumer;

identifying first information in the credit file associated with a first credit card and second information in the credit file associated with a second credit card, wherein the first information comprises at least a first account number and a first issuer associated with the first credit card and the second information comprises at least a second account number and a second issuer associated with the second credit card;

storing the first information and the second information;

transmitting to a computing device of the consumer a user interface indicating at least some of the first information and the second information;

receiving selections from the consumer via the user interface indicating one or more of the first credit card and the second credit card that the consumer would like to cancel;

receiving selections from the consumer via the user interface indicating one or more of the first credit card and the second credit card that the consumer would like to have reissued;

in response to the consumer selecting the first credit card for cancellation, accessing the stored information for the first credit card and transmitting a first cancellation request including the first account number to the first issuer;

in response to the consumer selecting the second credit card for cancellation, accessing the stored information for the second credit card and transmitting a second cancellation request including the second account number to the second issuer;

in response to the consumer selecting the first credit card for reissuance, transmitting a first reissuance request to the first issuer;

in response to the consumer selecting the second credit card for reissuance, transmitting a second reissuance request to the second issuer; and transmitting a notification to a computing device of the consumer indicating a status of any of the requests transmitted to the first issuer or the second issuer.

2. A computerized method comprising:

determining, by a computing system having one or more computer processors, respective credit card information for each of a plurality of credit cards issued to a consumer;

transmitting a user interface with the respective credit card information for at least some of the plurality of credit cards, the user interface including controls configured to receive indications of particular credit cards to one or more of cancel and reissue;

receiving input from the consumer via the user interface to cancel and reissue a first credit card of the plurality of credit cards;

initiating, by the computing system, cancellation and reissuance of the first credit card;

receiving input from the consumer via the user interface to cancel and not reissue a second credit card of the plurality of credit cards; and initiating, by the computing system, cancellation, without initiating reissuance, of the second credit card.

3. The computerized method of claim 2, further comprising:

accessing credit data of the consumer to determine credit card information for one or more of the plurality of credit cards issued to the consumer.

4. The computerized method of claim 3, wherein the credit data comprises a credit report of the consumer.

5. The computerized method of claim 2, wherein the credit card information of the first credit card comprises at least one of a file transfer protocol address, an internet protocol address, and an email address associated with a first issuer of the first credit card.

6. The computerized method of claim 5, wherein the cancellation is performed using at least one of the file transfer protocol address, the internet protocol address, or the email address associated with the first issuer.

7. The computerized method of claim 2, further comprising communicating, by the computing system, a second user interface indicating a status of cancellation and reissuance of the first credit card and the second credit card, and a status of reissuance of the first credit card.

8. A computer system for identifying financial cards associated with a consumer and initiating cancelation of selected financial cards, the system comprising:

an account detection module configured to access a credit file of a consumer and to identify financial card information in the credit file associated with a financial card of the consumer, wherein the financial card information comprises at least a financial card account number and a financial card issuer;

an account monitoring module configured to periodically access an updated credit file of the consumer to identify modifications to the financial card information; and an account cancellation module configured to provide to the consumer a first option to cancel and reissue the financial card and a second option to cancel and not reissue the financial card, the account cancellation module further configured to initiate, in response to selection of the first option by the consumer, cancellation of the financial card using the identified financial card account number and the identified financial card issuer and initiate reissuance of the financial card, initiate, in response to selection of the second option by the consumer, cancellation of the financial card using the identified financial card account number and the identified financial card issuer and not initiate reissuance of the financial card.

9. The computer system of claim 8 further comprising:

a reimbursement module configured to determine at least some unauthorized transactions charged to the financial card account number and to reimburse the consumer for the unauthorized transactions.

10. The computer system of claim 8, wherein the account cancellation module is configured to transmit an electronic communication to the financial card issuer with cancellation instructions that are sufficient to initiate cancellation of the financial card by the financial card issuer.

11. The computer system of claim 8, wherein the account cancellation module is configured to transmit an electronic communication to the financial card issuer with reissuance instructions that are sufficient to initiate reissuance of the financial card by the financial card issuer.

12. The computer system of claim 8, wherein the account detection module is configured to generate a user interface for display to a human account representative, the user interface including the financial card information, wherein the user interface is usable by the human account representative to initiate cancellation of the financial card.

13. The computer system of claim 8, wherein the account detection module is configured to generate a user interface for display to the consumer, wherein the computer system transmits the user interface to a consumer computing device via one or more electronic communication networks.

14. The computer system of claim 8, wherein the financial card comprises a credit card, a debit card, a retail store loyalty card, or an automated teller machine card.

15. A computerized method comprising:
  determining, by a computing system having one or more computer processors, respective credit card information for each of a plurality of credit cards issued to a consumer;
  providing to the computing system a user interface including a first one or more controls configured to receive input from the consumer indicating a request to cancel and reissue respective credit cards of the plurality of credit cards and a second one or more controls configured to receive input from the consumer indicating a request to cancel and not reissue respective credit cards of the plurality of credit cards;
  receiving, by the computing system, input via the user interface from the consumer to cancel and not reissue at least one credit card of the plurality of credit cards;
  initiating, by the computing system, cancellation of the at least one credit card without initiating reissuance of the at least one of credit card.

16. The computerized method of claim 15, further comprising:
  receiving, by the computing system, input from the consumer about a reissue decision for the at least one credit card.

17. The computerized method of claim 16 further comprising:
  initiating, by the computing system, reissuance of the first credit card.

18. The computerized method of claim 15, further comprising:
  transmitting a second user interface indicating a status of a cancellation request of the at least one credit card to a computing device of the consumer.

* * * * *